United States Patent [19]

Cocco

[11] E Re. 31,197

[45] Reissued Apr. 5, 1983

[54] TELEPHONE CORD HAVING BRAIDED OUTER JACKET

[75] Inventor: Eugene R. Cocco, Baltimore, Md.

[73] Assignee: Western Electric Company, Inc., New York, N.Y.

[21] Appl. No.: 367,188

[22] Filed: Apr. 9, 1982

Related U.S. Patent Documents

Reissue of:

[64] Patent No.: 4,313,645
Issued: Feb. 2, 1982
Appl. No.: 149,597
Filed: May 13, 1980

[51] Int. Cl.[3] ..... H01B 7/06

[52] U.S. Cl. ..... 339/103 M; 87/6; 156/88; 174/69; 174/117 F; 174/121 SR

[58] Field of Search ..... 174/69, 113 R, 113 C, 174/117 F, 117 M, 121 SR, 122 R, 124 R; 339/28, 29 R, 99 R, 103 M; 156/88; 264/281, DIG. 40; 87/6, 9, 11, 29

[56] References Cited

U.S. PATENT DOCUMENTS

| | | | |
|---|---|---|---|
| 789,651 | 5/1905 | Burlingham et al. | 174/113 R X |
| 1,140,980 | 5/1915 | Haynes | 174/69 X |
| 1,469,530 | 10/1923 | Petersen | 87/32 |
| 1,944,390 | 1/1934 | Aceves | 174/69 |
| 2,136,743 | 11/1938 | Hollenweger | 87/6 X |
| 2,143,649 | 1/1939 | Dansard | 174/69 |
| 2,206,934 | 7/1940 | Barrans et al. | 87/6 X |
| 2,217,832 | 10/1940 | Barrans | 87/6 |
| 2,232,524 | 2/1941 | Hackbarth | 87/6 |
| 2,255,890 | 9/1941 | Knowland | 156/88 |
| 2,339,683 | 1/1944 | Cox | 174/69 X |
| 2,450,429 | 10/1948 | Henning | 174/113 C |
| 2,452,431 | 10/1948 | Collins et al. | 174/69 X |
| 2,573,439 | 10/1951 | Henning | 174/69 |
| 2,609,417 | 9/1952 | Cox et al. | 174/69 |
| 2,920,351 | 1/1960 | Hardesty et al. | 174/69 X |
| 3,024,497 | 3/1962 | Hardesty et al. | 264/DIG. 40 X |
| 3,037,068 | 5/1962 | Wessel | 174/69 |
| 3,038,021 | 6/1962 | Larson | 174/69 |
| 3,246,075 | 4/1966 | Dansard | 174/69 |
| 3,324,229 | 6/1967 | Ingmanson | 174/69 |
| 3,699,498 | 10/1972 | Hardesty et al. | 339/99 R X |
| 3,761,869 | 9/1973 | Hardesty et al. | 339/99 R |
| 3,854,002 | 12/1974 | Glander et al. | 174/69 |
| 3,860,316 | 1/1975 | Hardesty | 339/99 R X |
| 3,944,459 | 3/1976 | Skobel | 156/54 X |
| 3,990,764 | 11/1976 | Krumreich | 339/196 A X |
| 4,082,585 | 4/1978 | Kanotz et al. | 156/51 |
| 4,090,763 | 5/1978 | Congdon et al. | 174/69 X |
| 4,123,585 | 10/1978 | Sparzak et al. | 428/379 |
| 4,148,539 | 4/1979 | Hardesty | 339/99 R |
| 4,166,881 | 9/1979 | Congdon et al. | 428/463 |
| 4,221,756 | 9/1980 | Piper et al. | 174/113 R X |
| 4,227,042 | 10/1980 | Lueddecke et al. | 174/69 X |

*Primary Examiner*—Laramie E. Askin
*Attorney, Agent, or Firm*—E. W. Somers

[57] ABSTRACT

A telephone cord which is particularly suited for use with some models of decorative telephones includes a plurality of individually insulated conductors, a plastic jacket which encloses the plurality of individually insulated conductors, and a braid which encloses the plastic jacket. While the braid is comprised of a woven band of cloth of a natural material or a synthetic material, in a preferred embodiment it is made of cotton which is dyed to a color which is compatible with that of portions of the decorative telephone. An end portion of the cord which is terminated with a modular plug that is capable of being inserted into a jack in the telephone is treated to cause the braid to be bonded to the plastic jacket so that when the jacket is removed to expose the conductors for purposes of plug termination, the braid will not fray.

6 Claims, 9 Drawing Figures

TELEPHONE CORD HAVING BRAIDED OUTER JACKET

Matter enclosed in heavy brackets [ ] appears in the original patent but forms no part of this reissue specification; matter printed in italics indicates the additions made by reissue.

TECHNICAL FIELD

This invention relates to a telephone cord having a braided outer jacket, and more particularly, to a telephone cord having a braided outer jacket that is aesthetically suitable for use with decorative telephones and that has excellent retractile and extensile properties.

BACKGROUND OF THE INVENTION

For some time, cords which are used on telephone instruments to connect a handset to a base or housing have been formed in a retractile configuration and have come to be known as spring cords. Such cords must have sufficient retractility to insure that they will return rapidly to their normal retracted form after having been extended and released and at the same time be sufficiently extensible so that they are capable of being extended without the application of excessively high forces.

Spring cords are generally constructed of highly flexible cordage having a plurality of individually insulated, mandrelated tinsel conductors. Each of these conductors is made by wrapping a plurality of tinsel ribbons made of a Phosphor-bronze material spirally around a multi-filament nylon center core. In the past, a retractile cord was made by enclosing the conductors in a braid comprising cotton and plastic strands and by enclosing the braid in an outer jacket of vulcanized rubber. See for example, U.S. Pat. No. 2,573,439 which issued on Oct. 30, 1951 in the name of G. E. Henning. More recently, each tinsel conductor has been covered with a served, knitted nylon and then insulated with an extrudable, plasticized polyvinyl chloride (PVC) composition after which the plurality of individually insulated conductors were jacketed with a plasticized PVC composition. See for example, U.S. Pat. No. 3,037,068. Cordage which was made by the just-described method was formed into spring cords in a manner such as described in U.S. Pat. Nos. 2,920,351 and 3,024,497 which issued on Jan. 12, 1960 and on Mar. 13, 1962, respectively, in the names of E. C. Hardesty and D. L. Myers, and which are incorporated by reference hereinto.

This construction proved to be necessary because of stringent service requirements that have been placed on telephone cords. The served tinsel conductor construction provided a high degree of cut-through protection for the PVC jacket during flexing, and the PVC jacket compound provided a protective outer jacket and maintained the arrangement of the individual conductors in a circular configuration. The above-described cordage design was determined to be suitable for the production of (1) a flexible straight or line cord which connects the telephone housing to a wall terminal and (2) a rectractile cord which connects the handset to the telephone housing.

A new concept in telephone station equipment includes the termination of a length of telephone cordage with a modular plug instead of individual spade-tipped conductors to provide what has come to be known as a modular cord. Jacks adapted to receive the plugs are mounted in the telephone housing or base and in a wall terminal thereby permitting easy replacement of either the line or spring cord by a customer or an installer. For a description of modular plugs and jacks, see for example, U.S. Pat. Nos. 3,699,498 and 3,761,869 which issued Oct. 17, 1972 and Sept. 25, 1973, respectively in the names of E. C. Hardesty, C. L. Krumreich, A. E. Mulberger, Jr. and S. W. Walden, and U.S. Pat. No. 3,860,316 which issued Jan. 14, 1975 in the name of E. C. Hardesty, all incorporated by reference hereinto.

Conversion to modularity and its associated plug-terminated cordage necessitated the development of telephone cordage having a smaller cross-section than that used in the past. A cordage design suitable for use with the modular plugs incorporated smaller conductors arranged in a parallel, planar array and enclosed with a somewhat oval-shaped jacket.

The dimensional constraints imposed by the modular plugs and jacks necessitated a reduction in the overall size of both the insulated conductors and of the jacket of the cordage. To reduce the size of the insulated conductor, it was necessary to replace the protective knitted nylon covering over the served tinsel with an insulation which would function as a high strength barrier to the cutting action of the tinsel conductors, and as the primary component to achieve resiliency in a retractile telephoe cord. The presently used modular cord includes conductors which are insulated with a polyethylene polyester thermoplastic copolymer such as is described in U.S. Pat. No. 4,090,763 which issued on May 23, 1978 in the names of W. I. Congdon et al, and which is incorporated by reference hereinto.

While such modular cords are suitable for many of the telephone instruments now on the market, customer reaction has mandated a new design for at least one style of a decorative telephone series. One such example is a decorative telephone which is sold under the designation Country Junction*, a trademark of the American Telephone and Telegraph Company. The Country Junction telephone includes a wooden cabinet that resembles an instrument used at the beginning of the century and which also includes a pair of pewter nonfunctional ringers. Market studies have shown that a telephone cord having a braided outer jacket is compatible with the Country Junction telephone and results in an attractively styled piece of customer station equipment.

The choice of a cord having a braided outer jacket for this particular telephone presents a problem. The cord which is presently supplied with the Country Junction telephone is a relatively short line cord which comprises a plurality of conductors individually enclosed in a nylon knit and a PVC cover with the plurality enclosed in a braided covering. Each end of the cord is whipped with thread to prevent fraying of the braided covering when the cord is terminated. Not only is such a cord not conducive to being formed into a retractile cord because of its lack of a memory element, but it is relatively expensive to terminate. Also, the braid is incapable of performing one function of the plastic jacket in a conventional modular cord, that function being to maintain the conductors in an ordered array at an end portion of the cord to facilitate their entry into correct ones of conductor-receiving troughs in a modular plug. Further, the shortened cord between the handset and the wall-mounted base severely limits the use of the telephone, particularly in a kitchen environment where it most usually will be installed. On the other hand, the use of a lengthy straight cord between the handset and the base would be a return to the problem of a dangling cord which was overcome by spring cords.

The above-described cords having a braided outer jacket have not been made into a retractile configuration to connect the handset to the wall cabinet of the Country Junction telephone because to do so would require the dispersal of rubber strands among the individually insulated conductors to provide the memory capability for the cord. See for example, U.S. Pat. No. 2,136,743. While the rubber strands provide memory for the cord so that it can be made into a retractile configuration, the arrangement of the strands and the conductors is relatively expensive to braid. Moreover the resultant cord cross-section, particularly at the whipped ends, is too large for use with modular plugs such as those disclosed in the above-identified Hardesty U.S. Pat. No. 3,860,316 which are used to terminate the end portions of the cords.

The prior art appears to be of little help in overcoming this problem. Straight cords having braided outer jackets have been used, *and* plastic cords are now used—but the problem is to market a telephone *cord* which emulates the past [but] *and* is compatible with present day modularity. Clearly, there is a need to provide a retractile telephone cord which may be terminated with modular plugs and which is capable of having a braided outer covering that is compatible with the telephone instrument to which it is connected.

SUMMARY OF THE INVENTION

The foregoing problems are solved by a telephone cord of this invention which meets the needs of customer station equipment styling while being compatible with today's system of modularity. The telephone cord of this invention includes a plurality of individually insulated conductors, an inner jacket of a plastic material and an outer covering of braid, which may be a cloth made of a naturally growing material such as cotton or of a synthetic material. In a preferred embodiment, the braid is cotton and is braided over the plastic jacket which is a polyvinyl chloride composition.

Each of the conductors is enclosed in a thermoplastic material which is capable of being coiled in a helical configuration and of being heat-set in such configuration. The thermoplastic has sufficient thermal memory to cause the cord to have excellent retractile properties.

In order to avoid fraying the cotton outer jacket when end portions of the plastic and cotton jackets are removed for plug termination purposes, end portions of the cotton outer jacket of each cord are coated with a paint which is capable of creating a bond between the braid and the plastic jacket. The paint may be a vinyl paint in a methyl ethyl ketone solvent, the vinyl drying to leave a residue of vinyl which impregnates the cotton braid and bonds the PVC inner jacket to the outer, braided jacket.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
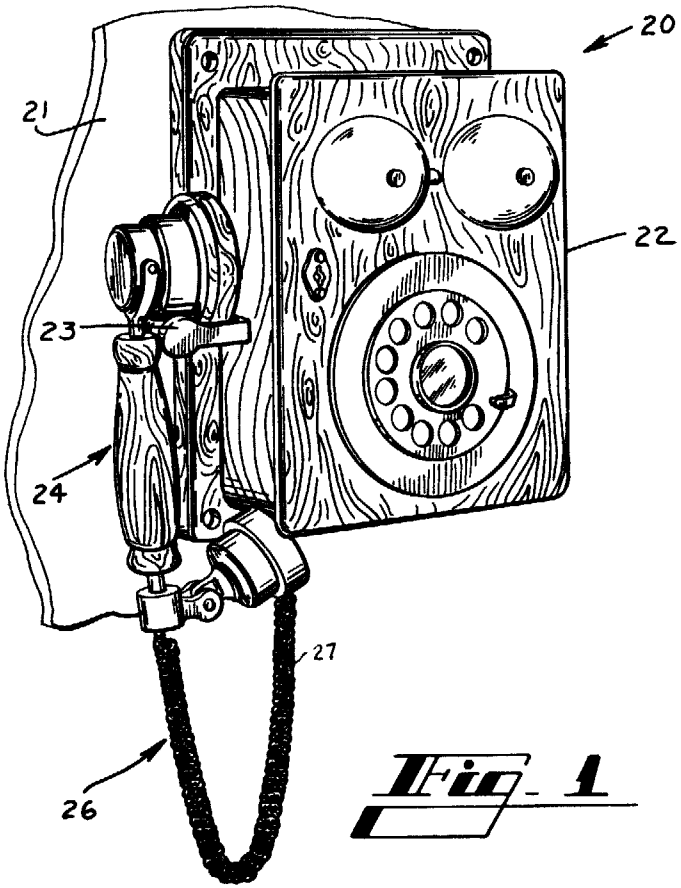
FIG. 1 is a perspective view of a Country Junction telephone and of a telephone cord of this invention which connects the handset portion to a base portion which is mounted on the wall.

Referring now to FIG. 1, there is shown a so-called Country Junction telephone 20 of a decorative telephone series. The telephone 20 is mounted on a wall 21, frequently a kitchen wall, and includes a base in the form of a wooden cabinet 22 having a hook 23 extending therefrom. The hook is adapted to hold a handset 24 and to cause a dial tone to be available when the handset is removed therefrom.

Figure 2:
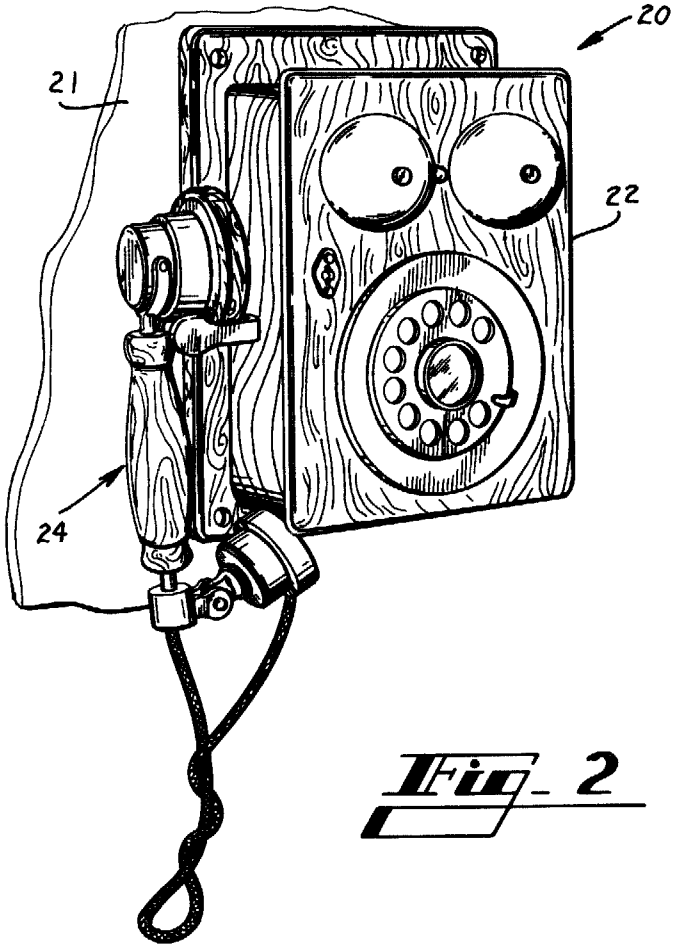
FIG. 2 is a perspective view of a Country Junction telephone in which the handset is connected to the base through a straight cord.

The handset 24 is connected electrically to the cabinet 22 through a cord 26 of this invention which may have the retractile configuration shown in FIG. 1 or the straight configuration shown in FIG. 2. The cord 26 includes a length of cordage 27 of this invention with each end of the cordage 26 being terminated with a modular plug such as that disclosed and claimed in U.S. Pat. No. 4,148,539 which issued on Apr. 10, 1979 in the name of E. C. Hardesty and which is incorporated by reference hereinto. Each of the plugs is adapted to be received in a cavity of a modular jack (*see FIG. 9*) in the handset 24 and in the wall cabinet 22. The modular jack is of the type such as that disclosed and claimed in U.S. Pat. No. 3,990,764 which issued on Nov. 9, 1976 in the name of C. L. Krumreich.

Figure 3:
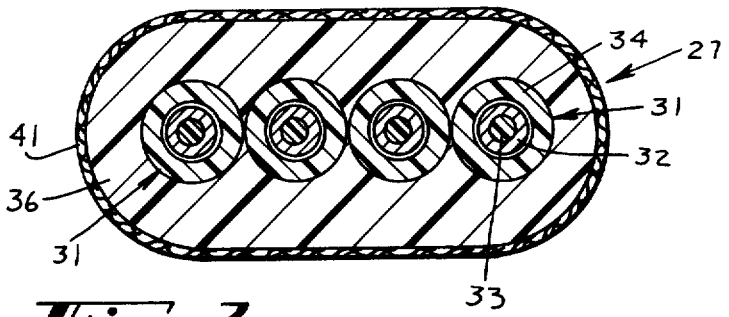
FIG. 3 is an enlarged cross-section end view of the cord of FIG. 1 to show the individual conductors, the inner jacket and an outer, braided covering.

The cordage 27 includes a plurality of individually insulated mandrelated tinsel conductors 31—31 (see FIG. 3). Each of these conductors 31—31 is made by wrapping a plurality of thin tinsel ribbons 32—32 spirally about a filamentary core 33. See for example U.S. Pat. No. 3,037,068 which issued on May 29, 1962 in the name of H. L. Wessel.

Each of the conductors 31—31 is insulated with a covering 34 of a plastic material which has particular properties including the capability of resisting tears caused by tinsel protrusions. Such a plastic material is a polyester polyether copolymer as marketed by DUPONT under the designation HYTREL® 7246 copolymer. A description of telephone cordage 27 which includes conductors 31—31 that are insulated with the above-described material is found in U.S. Pat. No. 4,090,763 which issued on May 23, 1978 in the names of W. I. Congdon, J. J. Mottine and W. C. Vesperman and which is incorporated by reference hereinto.

The HYTREL® copolymer insulated conductrs 31—31 are made in accordance with methods and apparatus which are described in U.S. Pat. No. 4,082,585 which issued on Apr. 4, 1978 in the names of W. M. Kanotz et al and which is incorporated by reference hereinto.

Figure 4:
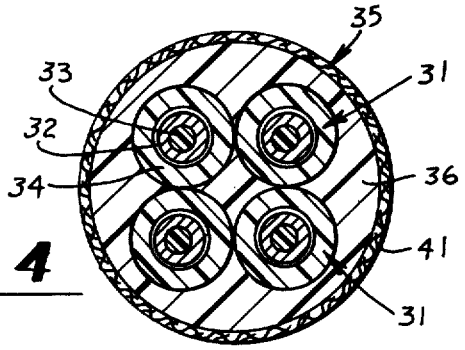

It should be understood that while the conductors 31—31 in the aforementioned Congdon et al patent are shown in a jacketed planar array which indeed is the configuration of a modular cord, this invention is not so limited. The conductors 31—31 of cordage 35 of an alternative embodiment of this invention could be arranged in a circular cross-section as well (see FIG. 4). The individually insulated conductors 31—31 are enclosed in a jacket 36 which is made of a plasticized polyvinyl chloride material. In a preferred embodiment, the jacket 36 is comprised of a material such as that disclosed and claimed in U.S. Pat. No. 4,123,585 which issued on Oct. 31, 1978 in the names of W. J. Sparzak and W. C. Vesperman and which is incorporated by reference hereinto. The jacket 36 may be opaque to match the color of a particular telephoe or may be clear.

Figure 5:
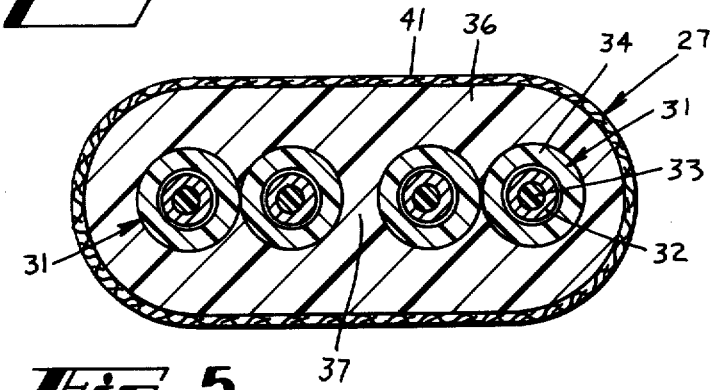
FIGS. 4–6 are enlarged cross-sectional views of alternate embodiments of cordage of this invention.

In the manufacture of a preferred embodiment of the cordage 27, at least two groups of individually insulated flexible conductors 31—31 which comprise a planar array are moved through an extruder core tube (not shown) in adjacent paths. As the groups are moved out of an exit portion of the core tube where they are spaced apart a predetermined distance and then along converging paths to a die, a plastic material is flowed about the array to enclose it and to form the jacket 36. Portions of the plastic material flow between the groups of the conductors 31—31 to achieve an equilibration of pressure in the plastic material about each group. This controls the direction and magnitude of lateral movement of each group within the plane of the array and causes the formation of a web 37 (see FIG. 5) which is integral with the jacket 36. The web 37 may vary in thickness along its length to compensate for changes in the outside diameter of the insulated conductors 31—31. The control of the lateral movement of each group between the core tube and the die and the formation of a web 37 results in a jacket 36 having substantial symmetry and in cordage having the groups separated by the web which has a thickness that is substantially less than the predetermined distance.

Methods and apparatus for causing the formation of the web 37 are disclosed in copending application Ser. No. 943,425 (now U.S. Pat. No. 4,221,756) which is commonly assigned and which was filed on Sept. 15, 1978 in the names of G. F. Piper, W. C. Vesperman and M. K. Wilson. A product which is made in accordance with the above-disclosed methods and apparatus is disclosed and claimed in application Ser. No. 06/110,577 (now U.S. Pat. No. 4,277,642) which was filed on Jan. 9, 1980 and which is a division of the above-identified Ser. No. 943,425.

It has also been found that in a conventional modular cord, the jacket may include a top coating 38 (see FIG. 6) in order to provide the cord with improved properties. The top coating 38 is a polyester, especially a polyester blend of a terpolymer of tetramethylene glycol reacted with terephthalic acid, isophthalic acid and azelaic acid and a copolymer of ethylene glycol reacted with terephthalic acid and sebasic acid. The plastic material which comprises the top coating 38 has a stiffness modulus, e.g. in the range of about 1757 to 2460 $kg/cm^2$ which is substantially greater than that, e.g. in the range of about 56 to 70 $kg/cm^2$, of the material which comprises the remainder of the jacket 36. Such a coating is disclosed and claimed in U.S. Pat. No. 4,166,881 which issued on Sept. 4, 1979 in the names of W. I. Congdon, J. J. Mottine and W. C. Vesperman and which is incorporated by reference hereinto. Of course, it should be apparent that because of the further covering of the plastic inner jacket 36, the cordage 27 of this invention need not include the top coating 38 but it is preferred since it enhances the retractile properties of the cordage.

The cord of this invention further includes a braid 41 which covers the jacket 36. The braid 41 is a woven band of cloth that is made from a synthetic material such as nylon or a natural fiber such as cotton. In a preferred embodiment, the braid 41 is a cotton material which for use with the Country Junction telephone is treated with a brown dye.

The braid 41 is applied in a conventional fashion with threads of the cotton material being woven about the jacketed cordage 27 as it is advanced through a braiding apparatus such as that disclosed in U.S. Pat. Nos. 1,469,530 or 2,217,832, which are incorporated by reference hereinto. Twelve spools of cotton are positioned on a top of the braiding apparatus and twelve at the bottom, with one braiding head being turned in one direction and another in an opposite direction. In order to construct a preferred embodiment cordage of this invention, each spool is turned 34 revolutions for each 30 centimeters of cordage which are advanced through the braiding apparatus.

A so-called softening pin which is well known in the art is positioned adjacent the path of travel of the cordage 27 as it is advanced through the braiding apparatus. As a result, the braiding apparatus sees a cross-section which is larger than the cordage itself and prevents the braid 41 from being applied in an excessively tight manner about the plastic jacket 36. The braid 41 of the cordage 27 of this invention does not inhibit the substantially uniform distribution of the helices of a retractile cord made from such cordage when the cord is extended. But for this care in the application of the braid 41, the braid would interfere with the torsional movement of the convolutions as the cordage 27 is extended and would result in some adjacent convolutions being closer together than others.

Figure 6:
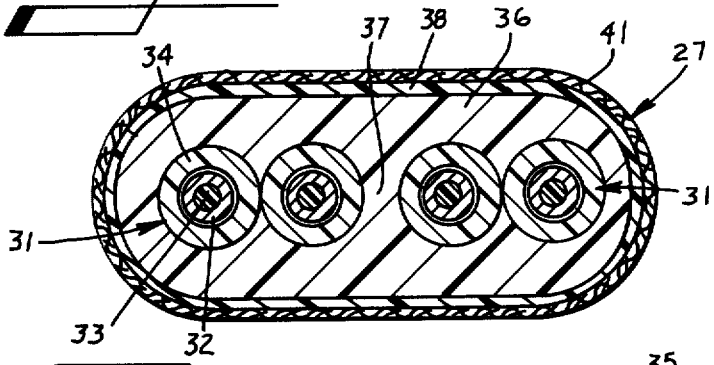

The cross-section of the cordage which is shown in FIG. 6, but without the braid 41 thereon has a width of about 0.43 cm and a height of about 0.18 cm. With the braid 41, the cordage cross-section is about 0.51 cm wide and about 0.26 cm in height. The braided jacket has a thickness of about 0.038 cm.

Figure 7:
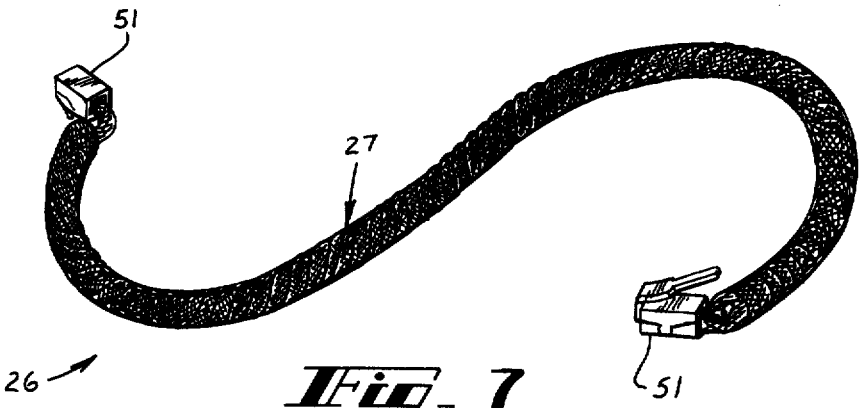
FIG. 7 is a perspective view showing cordage of this invention terminated with modular plugs.

The cordage 27 of this invention may be used in a straight configuration or in a retractile configuration and in either case a length of the cordage is terminated with a modular plug 51 (see FIG. 7) to produce a cord 26. In the retractile usage, the length of cordage 27 is first wound on a mandrel, (not shown) heat set by exposing the cordage to a temperature of about 138° C. for about ten minutes and removed from the mandrel while the direction of pitch of the helices is reversed. The cotton braid 41 is not degraded by its exposure to the heat set temperature. The process of making a retractile cord is well known and is disclosed for example in above-identified U.S. Pat. No. 2,920,351.

Figure 8:
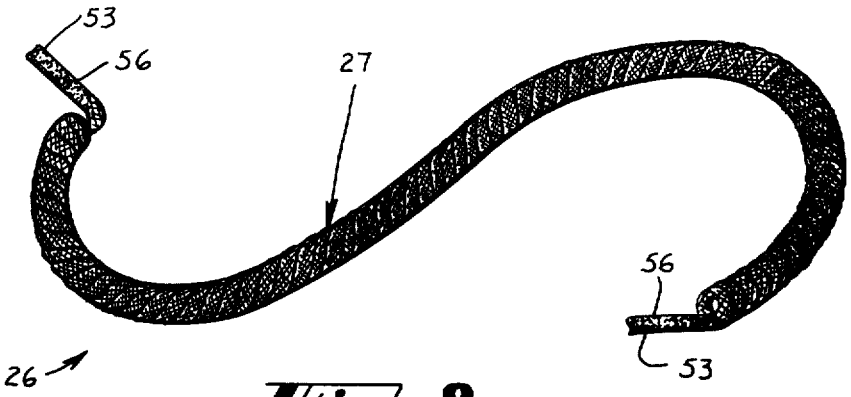
FIG. 8 is a perspective view of the cord of FIG. 1 of this invention to show the coating on end portions thereof for termination purposes.

In order to terminate an end of the cordage with a modular plug 51 to produce a cord 26, the jacket 36 and braid 41 must be removed from an end portion of a length of the cordage 27 (see FIG. 8). The manufacture of the length of coiled cordage 27 is accomplished so that a relatively short length 53, such as for example 1.3 to 2.0 cm, is uncoiled.

Where the braid 41 is removed from the end length 53 of the cordage, the remaining braid tends to fray at the boundary. This is avoided by applying a coating 56 over each end portion of each length of cordage, the coating comprising a composition which has an affinity for the plasticized PVC jacket 36. For cordage 27 which does not include the top coating 38, the coating 56 comprises about 11% by volume of a vinyl suspended in about 80% by volume of a methyl ethyl ketone solvent. For cordage 27 which includes the top coating 38, the coating 56 comprises a plasticized methyl methacrylate such as is disclosed and claimed in copending application Ser. No. 967,550 (now U.S. Pat. No. 4,227,042) which was filed on Dec. 7, 1978 in the names of D. E. Lueddecke, J. J. Mottine and W. C. Vesperman. The coating 56 impregnates the braid 41 and after the solvent evaporates, the jacket 36 is bonded to the braid. When an end length of the jacket 36 and braid 41 are removed, a coated, now bonded portion of braid and jacket remains thereby preventing any fraying.

Figure 9:
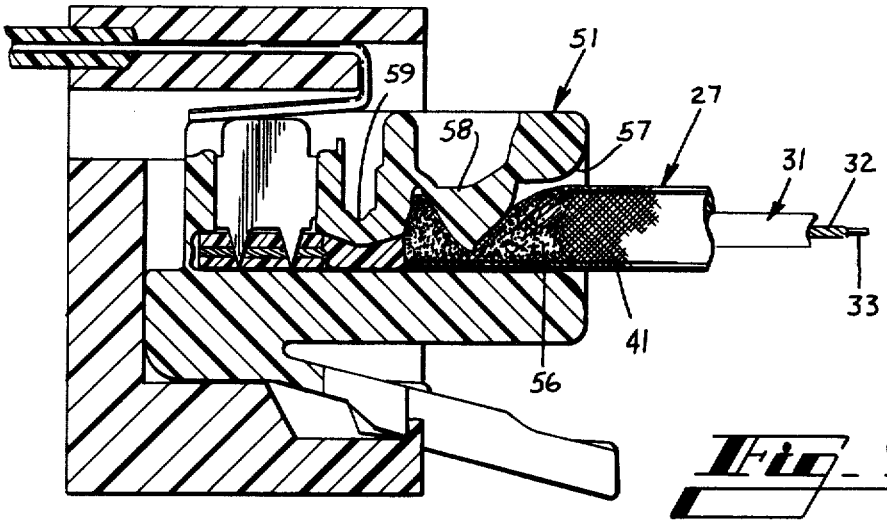
FIG. 9 is an elevational view partially in section to show one end of the [cord with an end of the] cordage terminated with a prior art modular plug *that has been inserted into a modular jack*.

As can be seen in FIG. 9, the stripping is accomplished so that when the end portion of the cordage 27 is inserted into a cavity 57 of the modular plug 51, one strain relief system 58 engages the braid 41 and a strain relief system 59 engages the exposed insulated conductors 31—31.

It is to be understood that the above-described arrangements are simply illustrative of the invention. Other arrangements may be devised by those skilled in the art which will embody the principles of the invention and fall within the spirit and scope thereof.

What is claimed is:

1. A length of retractile telephone cordage which is coiled in and heat-set in a helical configuration, said cordage comprising:

a plurality of conductors, each of said conductors being insulated with a thermoplastic material which is capable of being coiled in a helical configuration and of being heat-set in such configuration;

an inner jacket which is made of a plastic material and which encloses said plurality of individually insulated conductors; and a braided outer jacket which encloses and which is in engagement with said plastic inner jacket, said braided outer jacket including a coating which impregnates an end portion of the braid and bonds said end portion to said plastic inner jacket, said engagement of said braided outer jacket with said plastic inner jacket being sufficient to cause said impregnated end portion to adhere to said plastic inner jacket while being insufficient to [prevent the inhibition of] *inhibit* a substantially uniform distribution of helices of the retractile cordage when the retractile cordage is extended.

2. The cordage of claim 1, wherein said plastic inner jacket comprises a plasticized polyvinyl chloride composition and said braided outer jacket is cotton.

3. The cordage of claim 1, wherein said plastic material which comprises said plastic inner jacket has a flexural-modulus which is substantially less than that of the thermoplastic material which encloses each of said conductors.

4. The cordage of claim 1, wherein said plastic inner jacket includes a polyester coating and wherein there are groups of said conductors disposed in a substantially planar array, said cordage also including a web of plastic material which is integral with the plastic inner jacket and which separates adjacent groups of conductors, said web having a thickness which varies along the cordage to compensate for conductor size variations and to cause the distance from an outwardly facing surface of each outermost conductor in the array to be spaced a substantially constant distance from the outwardly facing surface of the plastic inner jacket along the length of the cordage.

5. The cordage of claim 4, wherein said coating comprises a plastic material having a stiffness modulus that is substantially greater than the stiffness modulus of the remainder of said plastic inner jacket.

6. A retractile telephone cord which comprises:

a length of telephone cordage which is coiled in a helical configuration and is heat-set in said configuration and which comprises:

a plurality of conductors, each of said conductors being insulated with a thermoplastic material, said thermoplastic material having sufficient thermal memory to cause the cord to be retractile;

an inner jacket which is made of a plastic material and which encloses said plurality of individually insulated conductors; and a braided outer jacket which encloses said plastic inner jacket, said braided outer jacket including a coating which impregnates an end portion of the braid and bonds said end portion to said plastic inner jacket, said braid being disposed about and in engagement with said plastic inner jacket, said engagement of said braided outer jacket with said plastic inner jacket being insufficient to [prevent the inhibition of] *inhibit* a substantially uniform distribution of helices of the cord when the cord is extended, while being sufficient to cause said impregnated end portion to adhere to said plastic inner jacket; and a modular plug having a plurality of terminal blades, and a cavity for receiving an end portion of said cordage, said modular plug being assembled to said length of said telephone cordage with an end portion of the cordage being received in said cavity, said modular plug including a first strain relief system for engaging said braid of said end portion to hold the cordage within the cavity and a second strain relief system for engaging the individually insulated conductors to facilitate their engagement by said terminal blades.

* * * * *